J. A. W. STUART.

TOILET ARTICLE.

APPLICATION FILED JUNE 20, 1910.

Reissued Sept. 6, 1910. 13,149.

WITNESSES:

J. Sarow

Mildred Lee

INVENTOR

Josiah A. Hamond Stuart

UNITED STATES PATENT OFFICE.

JOSIE A. WANOUS STUART, OF MINNEAPOLIS, MINNESOTA, ASSIGNOR TO DANIEL ERB, OF GRAND RAPIDS, MICHIGAN.

TOILET ARTICLE.

13,149. Specification of Reissued Letters Patent. Reissued Sept. 6, 1910.

Original No. 893,117, dated July 14, 1908, Serial No. 389,913. Application for reissue filed June 20, 1910. Serial No. 568,058.

*To all whom it may concern:*

Be it known that I, JOSIE A. WANOUS STUART, a citizen of the United States, residing at Minneapolis, in the county of Hennepin and State of Minnesota, have invented a new and useful Toilet Article, of which the following is a specification.

My object is to produce a toilet article in convenient shape to be used once, and which will only require the addition of water to prepare it for use; and my invention consists of the novel features herein shown, described and claimed.

Figure 1:
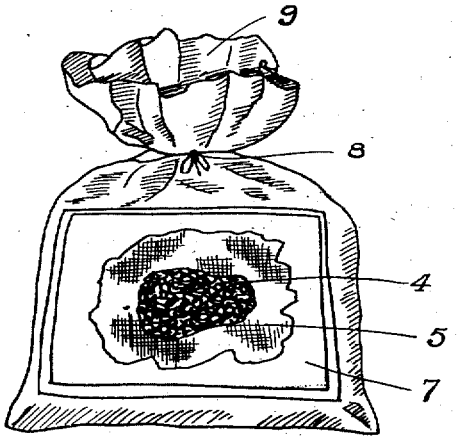
Figure 2:
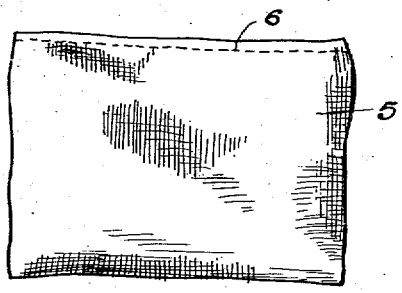
Figure 3:
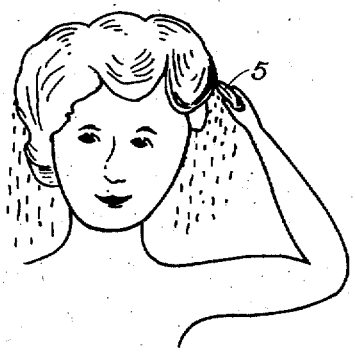

In the drawings: Figure 1 is a side elevation of single package of my toilet article in condition for preservation and shipment. Fig. 2 is a side elevation of the package with the covering removed. Fig. 3 shows the article in use.

Referring to the drawings in detail, similar characters of reference indicate like parts throughout the specification and the several views of the drawings.

In accordance with my invention, the hair tonic mixture 4 is inclosed in a porous cloth sack 5, said sack being closed by stitching 6, and the package thus formed is inclosed within a protective cover 7 formed of paper, which is closed by gathering an intermediate portion thereof near the open edge and securing same by a string 8, preferably in such manner that the loose portions will extend therefrom in form of a wide flaring frill, as 9.

In preparing the hair tonic mixture 4, I take about equal parts of bitter apple, camomile, soap bark, and lavender flowers, and mix them thoroughly in a dry state. I then take a small quantity of the dry mixture and place it in a porous cloth sack 5 and seal the sack by stitching 6, and then apply the removable covering.

When it is desired to use the hair tonic, the covering 7 is removed and water applied to the package which becomes a wet spongy mass saturated with hair tonic, and this mass is used as a sponge in washing and scrubbing the hair and head. A package is intended to be used only once.

The mixture is not only pleasant to use, giving the effect of a shampoo, but it is very beneficial to the hair and scalp; and the complete package thus produced is of neat and attractive appearance thereby increasing its value for sales and display purposes.

Thus I produce an article of manufacture comprising a spongy package saturated with hair tonic and adapted to be used as a sponge and shampoo, and apply a preservative covering.

Having thus described my invention, what I claim and desire to secure by Letters Patent of the United States, is the following:

1. A permeable bag normally inclosed within an impervious covering, the said permeable bag serving as a receptacle and as a strainer for a hair tonic mixture, said hair tonic mixture embodying fibrous substances which are adapted to serve as a sponge when the tonic ingredients are extracted, and said impervious covering being adapted to serve as a protection for the said permeable bag and its contents until removed for use, substantially as set forth and for the purposes specified.

2. An article of manufacture comprising a permeable bag normally inclosed within an outer covering said permeable bag serving as a receptacle and strainer for a hair tonic mixture, said hair tonic mixture embodying fibrous substances which together with said permeable bag is adapted to serve as a sponge when the aqueous extract is expressed, substantially for the purposes set forth.

3. An article of manufacture comprising a permeable bag 5 normally inclosed within a protective covering 7, said permeable bag serving as a receptacle and strainer for a hair tonic mixture 4, said hair tonic mixture embodying fibrous substances enabling said permeable bag and its contents to assume the consistency of a sponge when the aqueous extract is expressed, and said outer covering being adapted to confine the odors and other desirable qualities of said hair tonic mixture until removed for use, substantially for the purposes set forth.

JOSIE A. WANOUS STUART.

Witnesses:

NAOMI ANDERSON,

HENRIETTA KLINKER.